(12) United States Patent
De Traversay et al.

(10) Patent No.: US 11,778,983 B2
(45) Date of Patent: Oct. 10, 2023

(54) ANIMAL FEEDING ARRANGEMENT

(71) Applicant: DELAVAL HOLDING AB, Tumba (SE)

(72) Inventors: Maxime De Traversay, Tumba (SE); Krzysztof Karpisz, Tumba (SE); Szymon Karwacki, Tumba (SE)

(73) Assignee: DeLaval Holding AB, Tumba (SE)

( * ) Notice: Subject to any disclaimer, the term of this patent is extended or adjusted under 35 U.S.C. 154(b) by 589 days.

(21) Appl. No.: 16/970,174

(22) PCT Filed: Feb. 12, 2019

(86) PCT No.: PCT/SE2019/050117
§ 371 (c)(1),
(2) Date: Aug. 14, 2020

(87) PCT Pub. No.: WO2019/160482
PCT Pub. Date: Aug. 22, 2019

(65) Prior Publication Data
US 2021/0100216 A1   Apr. 8, 2021

(30) Foreign Application Priority Data
Feb. 16, 2018  (SE) .................................... 1850176-7

(51) Int. Cl.
*A01K 5/02* (2006.01)
(52) U.S. Cl.
CPC ................... *A01K 5/0266* (2013.01)
(58) Field of Classification Search
CPC ...... A01K 5/0266; A01K 5/001; A01K 5/005; A01K 5/007; B60P 1/42; B60P 1/00; B60P 1/36; B60P 1/365
See application file for complete search history.

(56) References Cited

U.S. PATENT DOCUMENTS

| 4,637,772 A * | 1/1987 | Stumpe ................. E02F 3/6273 403/379.5 |
| 2007/0123096 A1* | 5/2007 | Goodwin ............... H01R 24/20 439/504 |

(Continued)

FOREIGN PATENT DOCUMENTS

| DE | 31 27 718 | 1/1983 |
| EP | 0 739 161 | 3/2002 |

(Continued)

OTHER PUBLICATIONS

International Search Report for PCT/SE2019/050117 dated Apr. 10, 2019, 4 pages.

(Continued)

*Primary Examiner* — Magdalena Topolski
*Assistant Examiner* — Spencer T Callaway
(74) *Attorney, Agent, or Firm* — NIXON & VANDERHYE

(57) ABSTRACT

An animal feeding arrangement includes feed supply station (1), configured to house feed therein, a fence (2) that surrounds the feed supply station (1) and an area (3) adjacent to the feed supply station (1), a gate (4), arranged in the fence (2) and movable between an open state and a closed state, at least one autonomous mobile feed wagon (5), configured to receive feed from the feed supply station (1) and to deliver the feed to an animal feeding station (6) located outside the fence (2), and at least one feed loading device (7, 8), configured to load feed housed in the feed supply station (1) into the feed wagon (5). The feed wagon (5) includes a coupling device (9) configured to temporarily couple the feed wagon (5) to the feed loading device and enabling the feed wagon (5) to move the feed loading device.

19 Claims, 2 Drawing Sheets

(56) References Cited

U.S. PATENT DOCUMENTS

| | | | |
|---|---|---|---|
| 2007/0241536 A1* | 10/2007 | Wilkinson | B60D 1/36 |
| | | | 280/477 |
| 2010/0308559 A1* | 12/2010 | Tarasinski | A01B 59/00 |
| | | | 280/422 |
| 2011/0037241 A1* | 2/2011 | Temple | B60D 1/64 |
| | | | 280/421 |
| 2015/0053906 A1 | 2/2015 | Van Aalst | |
| 2015/0075436 A1 | 3/2015 | Wisse et al. | |
| 2015/0149050 A1 | 5/2015 | Palsgaard et al. | |
| 2015/0230427 A1 | 8/2015 | Wisse et al. | |
| 2016/0023867 A1 | 1/2016 | Posthumus | |
| 2020/0229395 A1* | 7/2020 | Ruholl | A01K 45/00 |

FOREIGN PATENT DOCUMENTS

| | | |
|---|---|---|
| EP | 1 523 881 | 4/2005 |
| EP | 2 710 890 | 3/2014 |
| NL | 1040480 | 5/2015 |

OTHER PUBLICATIONS

Written Opinion of the ISA for PCT/SE2019/050117 dated Apr. 10, 2019, 6 pages.
Swedish Search Report for 1850176-7 dated Sep. 14, 2018, 2 pages.

* cited by examiner

ANIMAL FEEDING ARRANGEMENT

CROSS-REFERENCE TO RELATED APPLICATIONS

This application is the U.S. national phase of International Application No. PCT/SE2019/050117 filed Feb. 12, 2019 which designated the U.S. and claims priority to Swedish Application No. 1850176-7 filed Feb. 16, 2018, the entire contents of each of which are hereby incorporated by reference.

FIELD OF THE INVENTION

The present invention relates to an animal feeding arrangement comprising
- a feed supply station, configured to house feed therein,
- a fence that surrounds the feed supply station and an area adjacent to the feed supply station,
- a gate, arranged in the fence and movable between an open state and a closed state,
- at least one autonomous mobile feed wagon, configured to receive feed from the feed supply station and to deliver the feed to an animal feeding station located outside said fence, and
- at least one feed loading device, configured to load feed housed in the feed supply station into the feed wagon.

An animal feeding station may be referred as any suitable device arranged to offer feed to the animals (trough, container, feed table etc.), and may be arranged to serve a group of animals or an individual animal. The animal feeding station may even be as simple as a dedicated area or floor on which feed is offered to the animals.

BACKGROUND ART

Animal feeding arrangements of the above-mentioned type are becoming increasingly used within the field of dairy farms, especially within the field of cow milking arrangements.

A feeding arrangement of the above-mentioned type is disclosed in NL 1040480. The mobile feed wagon with its feed loading device is configured to retrieve feed from the feed supply station, to leave the fenced area and to deliver the feed to animal feeding stations outside the fenced area. The area outside the fenced area is an area in which there may be both animals and humans. Collisions or other physical interaction between the feed wagon, the feed loading device and the animals or humans may occur.

It is an object of the present invention to provide an animal feeding arrangement that addresses the safety-problems that may appear in an arrangement in which an autonomous mobile feed wagon is configured to move in areas that are frequented also by animals and/or humans.

SUMMARY

The object of the invention is achieved by means of the initially defined animal feeding arrangement, which is characterised in that the feed wagon comprises a coupling device configured to temporarily couple the feed wagon to the feed loading device and enabling the feed wagon to move the feed loading device.

Accordingly, the feed wagon does not necessarily need to be connected to the feed loading device when moving in areas that are more likely to be frequented by animals and/or humans. Instead, the feed loading device could be disconnected and left at a suitable place as the feed wagon moves into such areas. As a result of its aimed purpose, the feed loading device is likely to be equipped with parts that could easily hurt both animals and humans, and the possibility of temporarily disconnecting the feed loading device thereof adds to safety. The invention promotes an operation in which the feed loading device is disconnected from the feed wagon and left in the fenced area as the feed wagon moves out of the latter.

According to one embodiment, the animal feeding arrangement is characterised in that
- the feed wagon comprises an electric energy storage device,
- the feed loading device comprises an electric energy storage device,
- and that the feed wagon and the feed loading device comprise means for transferring electric energy between the electric energy storage device of the feed wagon and the electric energy storage device of the feed loading device. Thereby, whichever of the feed wagon or the feed loading device that, for the moment, has most electric energy is able of transferring such energy to whichever of the feed wagon or the feed loading device that has an energy deficit.

According to one embodiment,
- the feed wagon comprises an electric energy storage device and
- the feed loading device comprises an electric motor,
- and the feed wagon and the feed loading device comprise means for transferring electric energy from the electric energy storage device of the feed wagon to the electric motor of the feed loading device.

Preferably, but not necessarily, the means for transferring electric energy comprise an arrangement configured to transfer electric energy wirelessly between the electric energy storage device of the feed wagon and the electric energy storage device or electric motor of the feed loading device. Thereby, electric connection devices that project from the feed wagon and that could be a safety risk for animals getting into contact with the feed wagon can be avoided.

According to one embodiment, the animal feeding arrangement is characterised in that
- the feed wagon is provided with a processing unit configured to
- decide that loading of the feed wagon is to be performed,
- initiate coupling of the feed wagon to the feed loading device,
- control the motion of the feed wagon and the feed loading device such that the feed loading device will be able of loading feed into the feed wagon while at the same time being coupled thereto, and
- disconnect the feed wagon from the feed loading device before controlling the feed wagon to leave the fenced area through said gate.

The processing unit may be any suitable processing unit, and may comprise hardware as well as software configured to control the operation of a motor, preferably an electric motor, of the feed wagon. Preferably, the feed wagon is provided with a position detection means, such as a tag interacting with an Ultra Wide Band (UWB) RTLS, configured to enable the processing unit to obtain information regarding the position of the feed wagon, preferably from said UWB RTLS. The processing unit should be configured to disconnect and park the feed loading device at a predetermined place, and configured to find that place and reconnect to the feed loading device without external assistance.

The feed loading device may also be equipped with position identification means that enable the feed wagon to find it and reconnect to it when needed.

According to one embodiment, the animal feeding arrangement is characterised in that
- the feed wagon comprises a container configured to contain feed,
- there is a mixer device arranged in the container,
- the feed wagon is provided with a position determination means configured for enabling detection of passage of the feed wagon through the gate,
- and that the feed wagon is provided with a processing unit which is configured to inactivate the mixer device as a response to a detection of a passage of the feed wagon from the fenced area through the gate by means of the position determination means.

According to one embodiment, the position determination means comprises a transmitter, preferably embodied by a so called tag, connected to an RTLS (Real Time Location System) that, for example, uses the RF, infrared or the ultra sound frequency range, for the purpose of determining/obtaining the position of the device provided with the transmitter, in this case the feed wagon. Preferably the RTLS system is an Ultra Wide Band RTLS. Other position sensor solutions are of course also applicable and within the claimed scope of protection.

The inactivation of the mixer is a safety measure, since the mixer may be arranged such that it could be reached by an animal or human and may comprises moving part such as a cutting knife or the like. According to one embodiment of the present invention, the mixer device is a rotating knife provided in the bottom of the feed wagon, wherein the container of the feed wagon has an opening via which the mixer device may be reached by either an animal or human. The opening may be an opening at the top of the container, aimed for receiving feed from the feed loading device.

According to one embodiment, the animal feeding arrangement is characterised in that
- the feed supply station is subdivided by a wall into a first substation configured to house a first type of feed, and a second substation configured to house a second type of feed,
- and that the animal feeding arrangement comprises a first feed loading device configured to load said first type of feed from said first substation into the feed wagon, and a second feed loading device configured to load said second type of feed from said second substation, and that
- the feed wagon comprises a processing unit configured to
- control the feed wagon to connect the feed wagon to the first feed loading device by means of said coupling device,
- control the motion of the feed wagon and the first feed loading device connected thereto such that the first feed loading device will be able of loading feed into the feed wagon from the first substation while at the same time being connected to the feed wagon,
- disconnect the feed wagon from the first feed loading device,
- control the feed wagon to connect the feed wagon to the second feed loading device by means of said coupling device,
- control the motion of the feed wagon and the second feed loading device connected thereto such that the second feed loading device will be able of loading feed into the feed wagon from the second substation while at the same time being connected to the feed wagon, and
- disconnect the feed wagon from the second feed loading device.

By such an arrangement, the different feed loading devices may be optimised with regard to the physical properties of the feed that they are supposed to be loading. If there is more than one feed wagon, the provision of plural feed loading devices also provides for parallel and simultaneous loading operations.

According to one embodiment, the animal feeding arrangement is characterised in that
- the feed wagon comprises a container configured to contain feed,
- the feed loading device is configured to move feed from the level of a floor on which the feed wagon is standing while being connected to the feed loading device up to a higher level at which the feed is loaded into the container.

Other solutions are possible within a wider sense of the invention, but the principle taking feed from the floor level enables a cost efficient and non-complicated design of the feed loading device. Feed from a high stack or high formation of feed can be taken up by the feed loading device without the latter being equipped with means for taking feed from high positions, and feed is prevented from being left on the floor or getting old at the floor level.

According to one embodiment, the feed loading device comprises a first roll and a second roll and an endless belt arranged around said first and second rolls and, and, when the feed loading device is connected to the feed wagon by means of said coupling device, a first of said rolls is at the level of said floor, and a second of said rolls is at or above the level of an opening through which feed is loaded into the feed wagon, and the endless belt is configured to move around said first and second rolls such that feed arranged on said floor is gripped by the endless belt at the level of the first roll and moved by the endless belt to the region of the second roll, where the feed is dropped into the container.

For the gripping of the feed, the belt may be provided with protruding elements, such as ribs or the like, which may extend perpendicularly to the longitudinal direction of the belt.

According to one embodiment, the coupling device is a magnetic coupling device and that the outer surface on at least the feed wagon is either flat or comprises a recess in a region of the magnetic coupling. Thereby, connection between the feed wagon and the feed loading device may be achieved also if there is a slight misalignment between the feed wagon and the feed loading device, which may happen due to clay or dirt covering the ground or wheels of any of the feed wagon or the feed loading device. There is also a safety reason behind not providing the feed wagon with any projecting coupling part.

According to an alternative embodiment, the coupling device comprises a pneumatic device by means of which the feed wagon is connected to the feed loading device, and the feed wagon is either flat or comprises a recess in a region of the pneumatic device. Also in this case there is a safety reason behind not to provide the feed wagon with any projecting coupling part.

Further features and advantages of the invention will be presented in the following detailed description of an embodiment.

BRIEF DESCRIPTION OF THE DRAWING

An embodiment of the present invention will be described by way of example with reference to the annexed drawing, on which.

DETAILED DESCRIPTION

Figure 1:
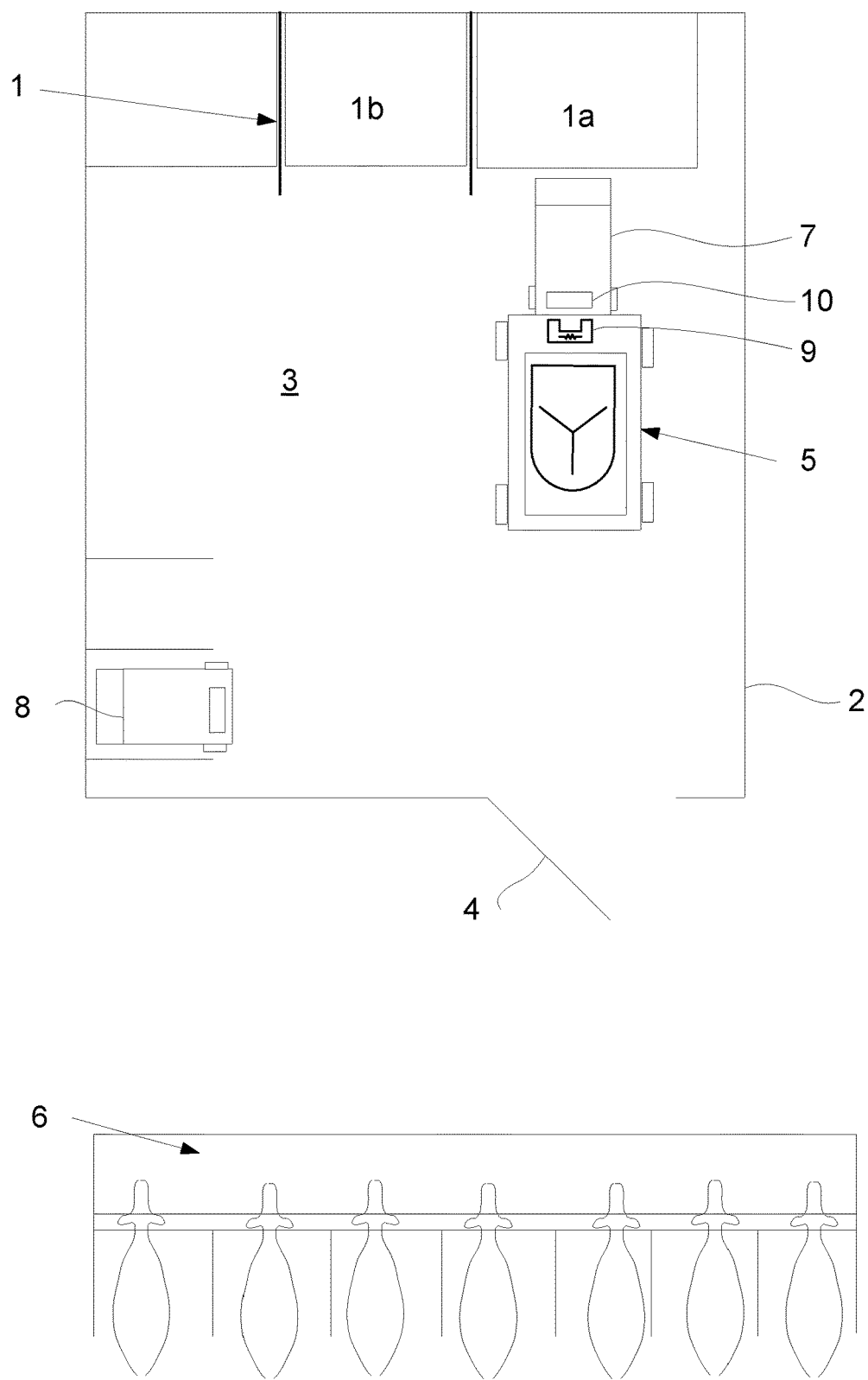
FIG. 1 is a schematic representation of an animal feeding arrangement according to one embodiment of the invention, as seen from above.

FIG. 1 shows an animal feeding arrangement comprising a feed supply station 1, configured to house feed therein, a fence 2 that surrounds the feed supply station 1 and an area 3 adjacent to the feed supply station 1, a gate 4, arranged in the fence 2 and movable between an open state and a closed state, an autonomous mobile feed wagon 5, configured to receive feed from the feed supply station 1 and to deliver the feed to an animal feeding station 6 located outside the area 3 surrounded by said fence 2, and two feed loading devices 7, 8 configured to load feed housed in the feed supply station 1 into the feed wagon 5. It should be understood that an animal feeding station may be referred as any suitable device arranged to offer feed to the animals (trough, container, feed table etc.), and may be arranged to serve a group of animals or an individual animal. The animal feeding station may even be as simple as a dedicated area or floor on which feed is offered to the animals. The feed wagon 5 comprises a coupling device 9 configured to temporarily couple the feed wagon 5 to any of the feed loading devices 7, 8 and enabling the feed wagon 5 to move the feed loading device 7, 8 to which it is connected. Each feed loading device 7, 8 also comprises a coupling device 10 configured to interact with the coupling device 9 of the feed wagon 5 to establish a connection between the feed wagon 5 and the feed loading device 7, 8. In the embodiment shown, the coupling device 9 of the feed wagon 5 comprises an electro magnet. The coupling device 10 of the respective feed loading device 7, 8 may be a body of magnetic material, which can be affected by the electro magnet 9. The coupling devices 9, 10 could be reversed in the sense that the electro magnet, which is the active part in such a design, could be positioned in the feed loading device and the body of magnetic material could be positioned in the feed wagon 5.

The autonomous mobile feed wagon 5 comprises an engine 11, which could be any kind of suitable engine but which is an electrical engine in the embodiment shown. It also comprises an electric energy storage device 12, formed by an electric accumulator. The feed loading device also comprises an electric energy storage device 13. There are provided means 14, 15 configured to transfer electric energy between the electric energy storage device 12 of the feed wagon 5 and the electric energy storage device 13 of the feed loading device. The means 14, 15 configured to transfer electric energy may be of any suitable kind, but it is preferred that they do not comprise elements that project from the feed wagon 5 and from the feed loading device 7, 8, in particular not from the feed wagon 5, which is configured to move in areas frequented by animals. In the embodiment shown, the means 14, 15 comprise devices for inductive transmission of electric energy, i.e. wireless transfer of electric energy.

In the embodiment shown, the feed loading device comprises an electric motor 26 and the means 14, 15 for transferring electric energy between the electric energy storage devices 12, 13 are also configured to transfer electric energy from the electric energy storage device 12 of the feed wagon to the electric motor 26 of the feed loading device 7, 8.

Figure 2:
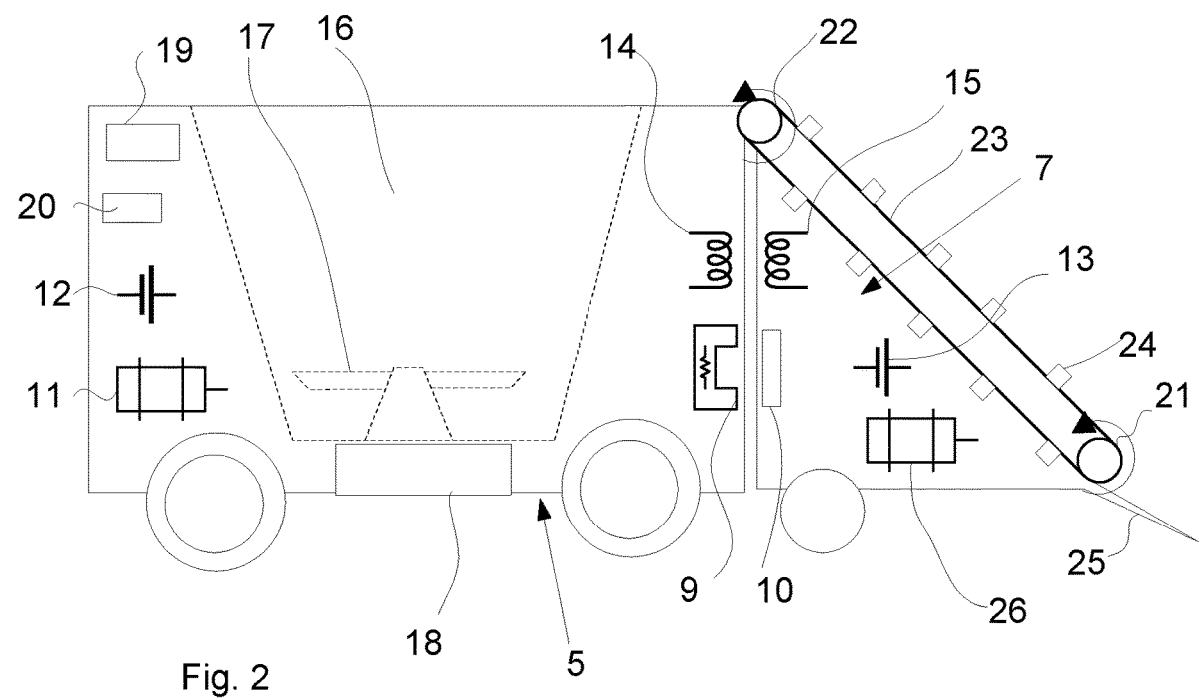
FIG. 2 is a schematic representation of a feed wagon and a feed loading device according to one embodiment of the invention.

The feed wagon 5 is also provided with a container 16 into which the feed loading devices 7, 8 are configured to load feed from an opening at the top of feed wagon 5. Inside the container 16, at the bottom thereof, the feed wagon 5 comprises a mixer device 17. The mixer device 17 comprises rotating knives. At the bottom of the container, below the mixer device 17, the feed wagon 5 comprises a feed-delivery device 18, shown schematically in FIG. 2. In the exemplifying embodiment, the feed delivery device 18 comprises an endless belt arranged in the bottom of the container 16, and an opening in a lateral side of the container 16. The endless belt is configured to transport feed out from the container 16 through said opening. As an alternative to the suggested endless belt, the feed delivery device 18 may comprise a rake or the like, by mean of which feed is transported out of the container 16. There are provided suitable drive means, such as an electric engine, for driving the feed delivery device 18.

The feed wagon 5 comprises a data processing unit 19 connected to and configured to control the operation of the electric motor 11 of the feed wagon 5 and the operation of the electric motor 16 of the feed loading device 7, 8 and also other drive means, such an electric motor that drives the feed delivery device 18 and/or the mixer device 17. The data processing unit 19 also controls the operation of coupling device 9, 10 and the operation of the means 14, 15 for transfer of electric energy. The data processing unit is configured to determine and/or to obtain the position of the feed wagon 5, the feed loading devices 7, 8, the feed supply station 1 and the animal feeding station and to control the motion of the feed wagon 5 on basis thereof. The feed wagon 5 may also be provided with a position determination means 20, which is configured to enable determination of the position of the feed-wagon, at least with regard to the essential parts of the arrangement with which the feed wagon is configured to interact, such as the feed supply station 1, the gate 4, the animal feeding station 6, the feed loading devices and the feed loading devices 7, 8. Preferably, the position determination means 20 comprises a transmitter (tag) connected to an RTLS (Real Time Location System) that, preferably is an Ultra Wide Band RTLS. The processing unit 19 is configured to control the different devices of the feed wagon 5 on basis of wagon position information from RTLS system to which the position determination means 20 is connected.

Accordingly, the processing unit 19 is configured to decide that loading of the feed wagon 5 is to be performed, initiate coupling of the feed wagon 5 to a feed loading device 7, 8, control the motion of the feed wagon 5 and the feed loading device 7, 8 such that the feed loading device 7, 8 will be able of loading feed into the feed wagon while at the same time being coupled thereto, and disconnect the feed wagon 5 from the feed loading device 7, 8 before controlling the feed wagon 5 to leave the fenced area 3 through said gate 4.

In the embodiment shown, the feed supply station 1 is subdivided by a wall into a first substation 1a configured to house a first type of feed, and a second substation 1b configured to house a second type of feed. The animal feeding arrangement comprises a first feed loading device 7 configured to load said first type of feed from said first substation 1a into the feed wagon 5, and a second feed loading device 8 configured to load said second type of feed from said second substation 1b. The processing unit 19 is configured to control the feed wagon 19 to connect the feed wagon 5 to the first feed loading device 7 by means of said coupling device 9, control the motion of the feed wagon 5 and the first feed loading device 7 connected thereto such that the first feed loading device 7 will be able of loading feed into the feed wagon 5 from the first substation 1a while at the same time being connected to the feed wagon 5 and then to disconnect the feed wagon 5 from the first feed loading device 7. Depending on which feed mixture that is reprogrammed to be delivered to the animal feeding station 6, the processing unit 19 may then control the feed wagon 5 to connect the feed wagon 5 to the second feed loading device 8 by means of said coupling device 9, control the motion of the feed wagon 5 and the second feed loading device 8 connected thereto such that the second feed loading device 8 will be able of loading feed into the feed wagon 5 from the second substation 1b while at the same time being connected to the feed wagon 5, and disconnect the feed wagon 5 from the second feed loading device 8. It should be mentioned that there may, of course, be further feed loading devices and feed sub-stations provided inside the fenced area 3. When feed loading has been finished, the processing unit 19 may be configured to trigger an opening of the gate such that the feed wagon 5 can exit through the gate 4 and move on to the animal feeding station 6, where the processing unit 19 is configured to control the delivery of feed from the feed wagon 5 to the animal feeding station 6 via control of the feed delivery device 18.

The feed wagon 5 is provided with at least one position determination means 20, preferably the transmitter, configured to enable detection of a passage of the feed wagon 5 through the gate 4 by means of an RTLS with which the transmitter interacts. The processing unit 19 is configured to inactivate the mixer device 17 as a response to said RTLS detecting a passage of the feed wagon 5 from the fenced area 3 through the gate 4.

The feed loading devices 7, 8 will now be described more in detail. The feed loading device 7, 8 comprises a first roll 21 and a second roll 22 and an endless belt 23 arranged around said first and second rolls 21, 22. When the feed loading device 7, 8 is connected to the feed wagon 5 by means of said coupling devices 9, 10, a first 21 of said rolls is at level of a floor on which the feed wagon 5 and feed loading device 7, 8 is standing. A second 22 of said rolls 21, 22 is at or above the level of an opening through which feed is loaded into the feed wagon 5, and the endless belt 23 is configured to move around said first and second rolls 21, 22 such that feed arranged on said floor is gripped by the endless belt at the level of the first roll 21 and moved by the endless belt 23 to the region of the second roll 22, where the feed is dropped into the container 16. The belt 23 is provided with protruding elements 24, such as ribs or the like, which extend perpendicularly to the longitudinal direction of the belt 23 and improves the ability of the belt 23 to bring feed with it. There is also provided a blade 25 at the lower end of the feed loading device 7, 8, which blade is inclined relative to the floor and which enables the feed loading device to push feed towards the endless belt 23 as the feed loading device 7, 8 is advanced towards and into a mass of feed arranged on the floor of the feed supply station 1. The electric motor 26 of the feed loading device is configured to drive at least one of the rolls 21, 22 for the purpose of driving endless belt 23. The processing unit 19 preferably controls the operation of the electric motor 26 of the feed loading device 7, 8.

The invention claimed is:

1. An animal feeding arrangement comprising:
   a feed supply station (1) configured to house feed therein;
   a fence (2) that surrounds the feed supply station (1) and an area (3) adjacent to the feed supply station (1);
   a gate (4) arranged in the fence (2) and movable between an open state and a closed state;
   at least one feed loading device (7, 8); and
   at least one autonomous mobile feed wagon (5), the at least one autonomous mobile feed wagon (5) comprising a coupling device (9) configured to temporarily couple the at least one autonomous mobile feed wagon (5) to the at least one feed loading device (7, 8),
   wherein, with the at least one autonomous mobile feed wagon (5) temporarily coupled to the at least one feed loading device (7, 8) via the coupling device (9), the at least one autonomous mobile feed wagon (5) is enabled to move the at least one feed loading device (7, 8) to the feed supply station (1),
   wherein, with the at least one autonomous mobile feed wagon (5) temporarily coupled to the at least one feed loading device (7, 8) via the coupling device (9) and the at least one feed loading device (7, 8) being located at the feed supply station (1), the at least one feed loading device (7, 8) is configured to load feed housed in the feed supply station (1) into the at least one autonomous mobile feed wagon (5) and the at least one autonomous mobile feed wagon (5) is configured to receive the feed from the at least one feed loading device (7, 8),
   wherein the coupling device (9) is operative to disconnect the at least one feed loading device (7, 8) from the at least one autonomous mobile feed wagon (5), and with the at least one feed loading device (7, 8) disconnected from the at least one autonomous mobile feed wagon (5), the at least one autonomous mobile feed wagon (5) is operative to move through the gate in the open state and then deliver the feed to an animal feeding station (6) located outside said fence (2), and
   wherein,
   the at least one autonomous feed wagon (5) comprises a processing unit (19) configured to:
      decide that loading of the feed into the at least one autonomous feed wagon (5) is to be performed,
      initiate coupling of the at least one autonomous feed wagon (5) to the at least one feed loading device (7, 8),
      control motion of the at least one autonomous feed wagon (5) and the at least one feed loading device (7, 8) such that the at least one feed loading device (7, 8) will be able to load the feed into the at least one autonomous feed wagon (5) while at the same time being coupled thereto, and
      disconnect the at least one autonomous feed wagon (5) from the at least one feed loading device (7, 8) before controlling the at least one autonomous feed wagon (5) to leave the fenced area (3) through said gate (4).

2. The animal feeding arrangement according to claim 1, wherein,
   the at least one autonomous feed wagon (5) comprises a first electric energy storage device (12),
   the at least one feed loading device (7, 8) comprises a second electric energy storage device (13), and
   the at least one autonomous feed wagon (5) and the at least one feed loading device (7, 8) comprise means (14, 15) for transferring electric energy between the first electric energy storage device (12) of the at least one autonomous feed wagon (5) and the second electric energy storage device (13) of the at least one feed loading device (7, 8).

3. The animal feeding arrangement according to claim 1, wherein,
the at least one autonomous feed wagon (5) comprises an electric energy storage device (12), and
the at least one feed loading device (7, 8) comprises an electric motor (26), and
the at least one autonomous feed wagon (5) and the at least one feed loading device (7, 8) comprise means (14, 15) for transferring electric energy from the electric energy storage device (12) of the at least one autonomous feed wagon (5) to the electric motor (26) of the at least one feed loading device (7, 8).

4. The animal feeding arrangement according to claim 1, wherein, the at least one autonomous feed wagon (5) comprises a container (16) configured to contain the feed,
there is a mixer device (17) arranged in the container (16),
the at least one autonomous feed wagon (5) is provided with a position determination means (20) configured for enabling detection of passage of the feed wagon (5) through the gate (4), and
the processing unit (19) is configured to inactivate the mixer device (17) as a response to a detection of a passage of the at least one autonomous feed wagon (5) from the fenced area (3) through the gate (4) by means of the position determination means (20).

5. The animal feeding arrangement according to claim 1, wherein,
the feed supply station (1) is subdivided into a first substation (1a) configured to house a first type of feed, and a second substation (1b) configured to house a second type of feed, and
the at least one feed loading device comprises a first feed loading device (7) configured to load said first type of feed from said first substation (1a) into the at least one autonomous feed wagon (5), and a second feed loading device (8) configured to load said second type of feed from said second substation (1b).

6. The animal feeding arrangement according to claim 1, wherein, the at least one autonomous feed wagon (5) comprises a container (16) configured to contain feed, and
the at least one feed loading device (7, 8) is configured to move feed from a level of a floor on which the at least one autonomous feed wagon (5) is standing while being connected to the at least one feed loading device (7, 8) up to a higher level at which the feed is loaded into the container (16).

7. The animal feeding arrangement according to claim 6, wherein, the at least one feed loading device (7, 8) comprises:
a first roll (21) and a second roll (22), and
an endless belt (23) arranged around said first and second rolls (21, 22),
wherein, when the at least one feed loading device (7, 8) is connected to the at least one autonomous feed wagon (5) by said coupling device (9), the first roll (21) is level to said floor, and the second roll (22) is at or above the level of an opening through which feed is loaded into the at least one autonomous feed wagon (5), and the endless belt (23) is configured to move around said first and second rolls (21, 22) such that feed arranged on said floor is gripped by the endless belt (23) at the level of the first roll (21) and moved by the endless belt (23) to the region of the second roll (22), where the feed is dropped into the container (16).

8. The animal feeding arrangement according to claim 1, wherein, the coupling device is a magnetic coupling device (9), and
the outer surface on at least the at least one autonomous feed wagon (5) is either flat in a region of the magnetic coupling device (9) or comprises a recess in the region of the magnetic coupling device (9).

9. The animal feeding arrangement according to claim 1, wherein, the coupling device comprises a pneumatic device by which the at least one autonomous feed wagon (5) is connected to the at least one feed loading device (7, 8), and
the at least one autonomous feed wagon (5) is either flat in a region of the pneumatic device or comprises a recess in the region of the pneumatic device.

10. An animal feeding arrangement comprising:
a feed supply station (1) configured to house feed therein;
a fence (2) that surrounds the feed supply station (1) and an area (3) adjacent to the feed supply station (1);
a gate (4) arranged in the fence (2) and movable between an open state and a closed state;
a feed loading device (7, 8); and
an autonomous mobile feed wagon (5),
the autonomous mobile feed wagon (5) comprising a coupling device (9) configured to temporarily couple the autonomous mobile feed wagon (5) to the feed loading device (7, 8),
wherein, with the autonomous mobile feed wagon (5) temporarily coupled to the at least one feed loading device (7, 8) via the coupling device (9), the mobile feed wagon (5) is enabled to move the feed loading device (7, 8),
wherein, with the autonomous mobile feed wagon (5) temporarily coupled to the feed wagon (5) to the feed loading device (7, 8) via the coupling device (9), the feed loading device (7, 8) is configured to load feed into the feed wagon (5),
wherein the coupling device (9) is operative to disconnect the feed loading device (7, 8) from the autonomous mobile feed wagon (5), and with the feed loading device (7, 8) disconnected from the autonomous mobile feed wagon (5), the autonomous mobile feed wagon (5) is operative to move and then deliver the feed to an animal feeding station (6) located outside said fence (2), and
wherein,
the at least one autonomous feed wagon (5) comprises a processing unit (19) configured to:
decide that loading of the autonomous feed wagon (5) is to be performed,
initiate coupling, via the coupling device (9), of the autonomous feed wagon (5) to the at least one feed loading device (7, 8),
control motion of the autonomous feed wagon (5) and the feed loading device (7, 8) such that the feed loading device (7, 8) is configured to load feed into the autonomous feed wagon (5) while at the same time being coupled thereto, and
disconnect the autonomous feed wagon (5) from the feed loading device (7, 8) before controlling the feed wagon (5) to leave the fenced area (3) through said gate (4).

11. The animal feeding arrangement according to claim 10, wherein,
the autonomous feed wagon (5) comprises a first electric energy storage device (12),
the feed loading device (7, 8) comprises a second electric energy storage device (13), and
the autonomous feed wagon (5) and the feed loading device (7, 8) comprise means (14, 15) for transferring electric energy between the first electric energy storage device (12) of the at least one autonomous feed wagon (5) and the second electric energy storage device (13) of the at least one feed loading device (7, 8).

12. The animal feeding arrangement according to claim 10, wherein,
the autonomous feed wagon (5) comprises an electric energy storage device (12),
the at least one feed loading device (7, 8) comprises an electric motor (26), and
the autonomous feed wagon (5) and the feed loading device (7, 8) comprise means (14, 15) for transferring electric energy from the electric energy storage device (12) of the at least one autonomous feed wagon (5) to the electric motor (26) of the at least one feed loading device (7, 8).

13. The animal feeding arrangement according to claim 10, wherein,
the at least one autonomous feed wagon (5) comprises a container (16) configured to contain the feed,
there is a mixer device (17) arranged in the container (16),
the at least one autonomous feed wagon (5) is provided with a position determination means (20) configured for enabling detection of passage of the feed wagon (5) through the gate (4), and
the processing unit (19) is configured to inactivate the mixer device (17) as a response to a detection of a passage of the at least one autonomous feed wagon (5) from the fenced area (3) through the gate (4) by means of the position determination means (20).

14. The animal feeding arrangement according to claim 10, wherein,
the feed supply station (1) is subdivided into a first substation (1a) configured to house a first type of feed, and a second substation (1b) configured to house a second type of feed,
the feed loading device (7, 8) comprises a first feed loading device (7) configured to load said first type of feed from said first substation (1a) into the at least one autonomous feed wagon (5), and a second feed loading device (8) configured to load said second type of feed from said second substation (1b).

15. The animal feeding arrangement according to claim 10, wherein,
the autonomous feed wagon (5) comprises a container (16) configured to contain the feed,
the feed loading device (7, 8) is configured to move feed from a level of a floor on which the autonomous feed wagon (5) is standing while being connected to the feed loading device (7, 8) up to a higher level at which the feed is loaded into the container (16).

16. The animal feeding arrangement according to claim 15, wherein,
a first roll (21) and a second roll (22), and
an endless belt (23) arranged around said first and second rolls (21, 22),
wherein, when the feed loading device (7, 8) is connected to the autonomous feed wagon (5) by said coupling device (9), the first (21) of said rolls is level to said floor, and the second (22) of said rolls is at or above the level of an opening through which feed is loaded into the at least one autonomous feed wagon (5), and the endless belt (23) is configured to move around said first and second rolls (21, 22) such that feed arranged on said floor is gripped by the endless belt (23) at the level of the first roll (21) and moved by the endless belt (23) to the region of the second roll (22), where the feed is dropped into the container (16).

17. The animal feeding arrangement according to claim 10, wherein,
the coupling device is a magnetic coupling device (9), and
the outer surface on at least the autonomous feed wagon (5) is either flat in a region of the magnetic coupling device (9) or comprises a recess in the region of the magnetic coupling device (9).

18. The animal feeding arrangement according to claim 10, wherein,
the coupling device comprises a pneumatic device by which the autonomous feed wagon (5) is connected to the feed loading device (7, 8), and
the autonomous feed wagon (5) is either flat in a region of the pneumatic device or comprises a recess in the region of the pneumatic device.

19. An animal feeding arrangement comprising:
a feed supply station (1) configured to house feed therein;
a fence (2) that surrounds the feed supply station (1) and an area (3) adjacent to the feed supply station (1);
a gate (4) arranged in the fence (2) and movable between an open state and a closed state;
a feed loading device (7, 8);
an autonomous mobile feed wagon (5) comprising a first electric energy storage device (12),
the autonomous mobile feed wagon (5) further comprising a coupling, the autonomous mobile feed wagon (5) comprising a coupling device (9) configured to temporarily couple the autonomous mobile feed wagon (5) to the feed loading device (7, 8),
wherein, with the autonomous mobile feed wagon (5) temporarily coupled to the at least one feed loading device (7, 8) via the coupling device (9), the mobile feed wagon (5) is enabled to move the feed loading device (7, 8),
wherein, with the autonomous mobile feed wagon (5) temporarily coupled to the feed wagon (5) to the feed loading device (7, 8) via the coupling device (9), the feed loading device (7, 8) is configured to load feed into the feed wagon (5), and
wherein the coupling device (9) is operative to disconnect the feed loading device (7, 8) from the autonomous mobile feed wagon (5), and with the feed loading device (7, 8) disconnected from the autonomous mobile feed wagon (5), the autonomous mobile feed wagon (5) is operative to move and then deliver the feed to an animal feeding station (6) located outside said fence (2); and
a processing unit (19) configured to control devices of the feed wagon (5) and to:
decide that loading of the autonomous feed wagon (5) is to be performed,
initiate coupling, via the coupling device (9), of the autonomous feed wagon (5) to the at least one feed loading device (7, 8),
control motion of the autonomous feed wagon (5) and the feed loading device (7, 8) such that the feed loading device (7, 8) is configured to load feed into the autonomous feed wagon (5) while at the same time being coupled thereto, and
disconnect the autonomous feed wagon (5) from the feed loading device (7, 8) before controlling the feed wagon (5) to leave the fenced area (3) through said gate (4).

* * * * *